(12) United States Patent
Sun (10) Patent No.: US 10,207,729 B2
(45) Date of Patent: Feb. 19, 2019

(54) FOLDING TYPE COLLAPSIBLE WAGON

(71) Applicant: Blue Ridge Recreational Gear, LLC, Tybee Island, GA (US)

(72) Inventor: Benlong Sun, Zhejiang (CN)

(73) Assignee: Blue Ridge Recreational Gear, LLC., Tybee Island, GA (US)

( * ) Notice: Subject to any disclaimer, the term of this patent is extended or adjusted under 35 U.S.C. 154(b) by 0 days.

(21) Appl. No.: 15/806,930

(22) Filed: Nov. 8, 2017

(65) Prior Publication Data

US 2018/0354536 A1 Dec. 13, 2018

(30) Foreign Application Priority Data

Jun. 9, 2017 (CN) .......................... 2017 1 0449973
Jun. 9, 2017 (CN) .......................... 2017 1 0449974

(Continued)

(51) Int. Cl.
*B62B 3/00* (2006.01)
*B62B 3/02* (2006.01)

(52) U.S. Cl.
CPC .............. *B62B 3/025* (2013.01); *B62B 3/007* (2013.01); *B62B 2205/06* (2013.01); *B62B 2205/24* (2013.01)

(58) Field of Classification Search
CPC B62B 3/007; B62B 3/02; B62B 3/025; B62B 3/027; B62B 1/008; B62B 1/12
See application file for complete search history.

(56) References Cited

U.S. PATENT DOCUMENTS 2,049,683 A * 8/1936 Baumgardner ........... B62B 3/02
248/129
D411,387 S 6/1999 Zheng
(Continued)

FOREIGN PATENT DOCUMENTS

WO WO 2017088535 A1 6/2017
WO WO 2017088536 A1 6/2017

*Primary Examiner* — Hau V Phan
(74) *Attorney, Agent, or Firm* — WPAT, P.C., Intellectual Property Attorneys; Anthony King (57) ABSTRACT

A folding type collapsible wagon comprises a frame assembly, a tow bar assembly and wheels, wherein the tow bar assembly is arranged in front of the frame assembly, and each side frame comprises coplanar X-shaped cross tube assemblies. Each coplanar X-shaped cross tube assembly comprises a first oblique tube, two second oblique tubes and a hollow seat, wherein a first strip opening is formed in the middle of the hollow seat in the front-back direction, tube connectors are oppositely arranged at the front end and the rear end of the hollow seat in the vertical direction respectively, the first oblique tube penetrates through the first strip opening and is hinged to the middle of the first strip opening at the center through a hinge shaft, the two second oblique tubes are mounted in the tube connectors at the front end and the rear end of the hollow seat respectively, the two second oblique tubes are arranged in parallel and intersect with the first oblique tube in an X shape, and the first oblique tube, the two second oblique tubes and the hollow seat are all located on the same plane. The folding type collapsible wagon provided by the present disclosure is high in space utilization rate and attractive.

20 Claims, 8 Drawing Sheets

(30) Foreign Application Priority Data

| | | |
|---|---|---|
| Jun. 9, 2017 | (CN) | 2017 2 0694905 U |
| Jun. 9, 2017 | (CN) | 2017 2 0694971 U |
| Jun. 9, 2017 | (CN) | 2017 2 0694972 U |
| Jun. 9, 2017 | (CN) | 2017 2 0694973 U |
| Jun. 9, 2017 | (CN) | 2017 2 0694974 U |
| Jun. 9, 2017 | (CN) | 2017 2 0694975 U |
| Jun. 9, 2017 | (CN) | 2017 2 0695021 U |
| Jun. 9, 2017 | (CN) | 2017 2 0695022 U |
| Jun. 9, 2017 | (CN) | 2017 2 0695023 U |
| Jul. 27, 2017 | (CN) | 2017 2 0948557 U |

(56) References Cited

U.S. PATENT DOCUMENTS

| | | |
|---|---|---|
| 5,975,626 A | 11/1999 | Aycock |
| D432,325 S | 10/2000 | Zheng et al. |
| D432,823 S | 10/2000 | Zheng |
| D433,244 S | 11/2000 | Zheng |
| D433,574 S | 11/2000 | Zheng |
| 6,158,361 A | 12/2000 | Zheng et al. |
| 6,231,119 B1 | 5/2001 | Zheng |
| 6,234,089 B1 | 5/2001 | Zheng et al. |
| 6,237,993 B1 | 5/2001 | Zheng |
| 6,241,311 B1 | 6/2001 | Zheng |
| 6,247,748 B1 | 6/2001 | Zheng |
| 6,296,304 B1 | 10/2001 | Zheng |
| 6,302,479 B1 | 10/2001 | Zheng |
| 6,364,411 B1 | 4/2002 | Zheng |
| 6,494,530 B1 | 12/2002 | Zheng |
| D515,830 S | 2/2006 | Zheng |
| D516,825 S | 3/2006 | Zheng |
| D516,826 S | 3/2006 | Zheng |
| D517,819 S | 3/2006 | Zheng |
| 7,100,975 B1 | 9/2006 | Zheng |
| 7,281,731 B2 * | 10/2007 | Shamah ............ B62B 1/12 280/639 |
| 7,328,940 B2 | 2/2008 | Zheng |
| 7,396,073 B2 | 7/2008 | Zheng |
| 7,441,287 B2 | 10/2008 | Zheng |
| 8,011,686 B2 * | 9/2011 | Chen ............ B62B 3/007 280/651 |
| 8,162,349 B1 * | 4/2012 | Roselle ............ B62B 1/008 280/639 |
| 9,056,621 B1 * | 6/2015 | Jin ............ B62B 3/027 |
| 9,073,564 B2 | 7/2015 | Yang et al. |
| 9,145,154 B1 * | 9/2015 | Horowitz ............ B62B 3/025 |
| 9,211,897 B2 * | 12/2015 | Yang ............ B62B 3/02 |
| 9,580,095 B2 * | 2/2017 | Vargas, II ............ B62B 3/02 |
| 9,738,298 B1 * | 8/2017 | Yang ............ B62B 3/025 |
| 2008/0217886 A1 * | 9/2008 | Poppinga ............ B62B 3/02 280/651 |
| 2010/0090444 A1 * | 4/2010 | Chen ............ B62B 3/007 280/651 |
| 2010/0156069 A1 * | 6/2010 | Chen ............ B62B 3/007 280/639 |
| 2011/0204598 A1 * | 8/2011 | Stevenson ............ B62B 3/02 280/639 |

* cited by examiner

FOLDING TYPE COLLAPSIBLE WAGON

PRIORITY/RELATED DOCUMENTS

This patent application incorporates by reference in their entireties and claims priority to these co-pending Chinese patent applications filed on Jun. 9, 2017; namely, Application Nos. 201720694971.X; 201720694972.4; 201710449974.1; 201720695021.9; 201720694974.3; 201720695022.3; 201720695023.8; 201720694975.8; 201720694905.2; 201710449973.7; 201720694973.9 and filed on Jul. 27, 2017, namely Application No. 201720948557.7 all entitled the following; namely, one or more version of a pull-cart; namely "Translational Collapsible Wagon (Chinese Translation)," "Folding Collapsible Wagon (Chinese Translation)", and all with the same inventor(s).

COPYRIGHT NOTICE

This disclosure contains material which is subject to copyright protection. The copyright owner makes no objection to reproduction of this disclosure as disclosed in the Patent and Trademark Office files, record, or the like. Otherwise, the copyright owner reserves all copyright rights whatsoever for this patent disclosure. 37 CFR 1.71(d).

BACKGROUND OF THE DISCLOSURE

The following information may be useful in a better understanding of this disclosure. Please note that information contained in this section is not an admission that the information provided is material or prior art to this disclosure or as described in claimed disclosure, or that any publication or document that is specifically, implicitly or otherwise referenced is prior art.

Technical Field

The present disclosure relates to the technical field of wagons, in particular to a folding type collapsible wagon.

2. Description of Related Art

According to most translational collapsible wagons on the market, two steel tubes with the same length are riveted together to form an X-shaped assembly after openings are punched in the centers of the steel tubes. Although the structure is simple, since the steel tubes are connected front and back in an overlapping mode, after a wagon is assembled, brackets connected with the X-shaped assemblies have to be staggered up and down along the distance of one steel tube so as to be mounted. Consequentially, the attractiveness is severely affected after the wagon is folded or unfolded, and the space utilization rate of the wagon is low.

BRIEF SUMMARY OF THE DISCLOSURE

For overcoming the defects that an existing wagon is low in space utilization rate and not attractive enough, the present disclosure provides a folding type collapsible wagon which is high in space utilization rate and attractive.

According to the technical scheme adopted by the present disclosure for solving the technical problems:

In one aspect of an embodiment, a folding type collapsible wagon is disclosed including a frame assembly, a tow bar assembly and wheels. The tow bar assembly is arranged in front of the frame assembly, the wheels are arranged at the bottom of the frame assembly. The frame assembly includes a bottom frame, a front frame arranged in front of the bottom frame, a rear frame arranged behind the bottom frame, and collapsible side frames arranged on the left side and the right side of the bottom frame. wherein the front frame comprises a coplanar X-shaped cross tube assembly, inner guide tubes and outer guide tubes, the inner guide tubes and the outer guide tubes are all arranged vertically.

In some embodiments, each side frame include coplanar X-shaped cross tube assemblies. In an example, each coplanar X-shaped cross tube assembly comprises a first oblique tube, two second oblique tubes and a hollow seat. In an example, a first strip opening is formed in the middle of the hollow seat in the front-back direction, tube connectors are oppositely arranged at the front end and the rear end of the hollow seat in the vertical direction respectively, the first oblique tube penetrates through the strip opening and is hinged to the middle of the strip opening at the center through a hinge shaft, the two second oblique tubes are mounted in the tube connectors at the front end and the rear end of the hollow seat respectively.

In some embodiments, the two second oblique tubes are arranged in parallel and intersect with the first oblique tube in an X shape, and the first oblique tube, the two second oblique tubes and the hollow seat are all located on the same plane. In one example, the first oblique tube is at least 50% greater in length than either of the two second oblique tubes. In one example, the first oblique tube is greater than 2 times as great in length as either of the two second oblique tubes.

In some embodiments, the front ends and the rear ends of the side frames are hinged to the front frame and the rear frame through upper brackets and lower brackets respectively. In an example, the bottom frame includes a front bottom beam and a rear bottom beam, the rear end of the front bottom beam and the front end of the rear bottom beam can be turned by 90 degrees to be hinged together. In an example, the front end of the front bottom beam is hinged to the lower brackets of the front frame, and the rear end of the rear bottom beam is hinged to the lower brackets of the rear frame.

In some embodiments, the upper ends of the inner guide tubes are connected with the upper brackets, the lower ends of the inner guide tubes are mounted in the outer guide tubes in a vertically telescopic mode, and the lower ends of the outer guide tubes are connected with the lower brackets. In an instance, the structure of the rear frame is the same as the structure of the front frame.

Furthermore, in an example, each side frame includes two coplanar X-shaped cross tube assemblies arranged side by side. In one example, the two coplanar X-shaped cross tube assemblies are the front coplanar X-shaped cross tube assembly and the rear coplanar X-shaped cross tube assembly respectively. Furthermore, in an example, the front end of the first oblique tube of the front coplanar X-shaped cross tube assembly of the side frame on the left side of the bottom frame is hinged to the lower bracket on the left side of the front frame, the rear end of the first oblique tube of the front coplanar X-shaped cross tube assembly of the side frame on the left side of the bottom frame is hinged to the front end of the front second oblique tube of the rear coplanar X-shaped cross tube assembly on the same side through a hinged joint.

In some embodiments, the front end of the front second oblique tube of the front coplanar X-shaped cross tube assembly of the side frame on the left side of the bottom frame is hinged to the upper bracket on the left side of the front frame, and the rear end of the rear second oblique tube of the front coplanar X-shaped cross tube assembly of the side frame on the left side of the bottom frame is hinged to the front end of the first oblique tube of the rear coplanar X-shaped cross tube assembly on the same side through a bearing hinged joint.

In some embodiments, the rear end of the first oblique tube of the rear coplanar X-shaped cross tube assembly of the side frame on the left side of the bottom frame is hinged to the upper bracket on the rear frame, and the rear end of the rear second oblique tube of the rear coplanar X-shaped cross tube assembly of the side frame on the left side of the bottom frame is hinged to the lower bracket on the left side of the rear frame;

In some embodiments, the front end of the first oblique tube of the front coplanar X-shaped cross tube assembly of the side frame on the right side of the bottom frame is hinged to the upper bracket on the right side of the front frame, and the rear end of the first oblique tube of the front coplanar X-shaped cross tube assembly of the side frame on the right side of the bottom frame is hinged to the front end of the front second oblique tube of the rear coplanar X-shaped cross tube assembly on the same side through a bearing hinged joint. In an example, the front end of the front second oblique tube of the front coplanar X-shaped cross tube assembly of the side frame on the right side of the bottom frame is hinged to the lower bracket on the right side of the front frame. In an example, the rear end of the rear oblique second tube of the front coplanar X-shaped cross tube assembly of the side frame on the right side of the bottom frame is hinged to the front end of the first oblique tube of the rear coplanar X-shaped cross tube assembly on the same side through a hinged joint.

In some embodiments, the rear end of the first oblique tube of the rear coplanar X-shaped cross tube assembly of the side frame on the right side of the bottom frame is hinged to the lower bracket on the right side of the rear frame, and the rear end of the rear second oblique tube of the rear coplanar X-shaped cross tube assembly of the side frame on the right side of the bottom frame is hinged to the upper bracket of the rear frame.

In some embodiments, the left end of the first oblique tube of the coplanar X-shaped cross tube assembly of the front frame is hinged to the upper bracket on the left side of the front frame. In an example, the right end of the first oblique tube of the coplanar X-shaped cross tube assembly of the front frame is hinged to the lower bracket on the right side of the front frame. In an example, the left end of the left second oblique tube of the coplanar X-shaped cross tube assembly of the front frame is hinged to the lower bracket on the left side of the front frame, and the right end of the right second oblique tube of the coplanar X-shaped cross tube assembly of the front frame is hinged to the upper bracket on the right side of the front frame.

In some embodiments, the left end of the first oblique tube of the coplanar X-shaped cross tube assembly of the rear frame is hinged to the lower bracket on the left side of the rear frame, and the right end of the first oblique tube of the coplanar X-shaped cross tube assembly of the rear frame is hinged to the upper bracket on the right side of the rear frame. In an example, the left end of the left second oblique tube of the coplanar X-shaped cross tube assembly of the rear frame is hinged to the upper bracket on the left side of the rear frame, and the right end of the right second oblique tube of the coplanar X-shaped cross tube assembly of the rear frame is hinged to the lower bracket on the right side of the rear frame.

Furthermore, in some embodiments, the tow bar assembly includes a handle, an upper tow bar, a tow bar connecting seat, a tow bar limiting seat used for preventing the upper tow bar from being pulled out, two lower tow bars and a locking mechanism. In an example, the upper end of the upper tow bar is fixedly connected with the handle, the tow bar limiting seat is in a T shape, the lower portion of the tow bar limiting seat is fixed to the bottom of the lower end of the upper tow bar, the maximum outer diameter of the tow bar limiting seat is greater than the outer diameter of the upper tow bar, and the upper portion of the tow bar limiting seat stretches into the upper tow bar from bottom to top.

In some embodiments, the two lower tow bars are the left lower tow bar and the right lower tow bar respectively. In one example, the tow bar connecting seat is provided with a center opening in the axial direction, and arranged outside the upper tow bar in a sleeving mode and located above the tow bar limiting seat. In one example, the upper end of the left lower tow bar is hinged to the left side of the tow bar connecting seat, and the lower end of the left lower tow bar is hinged to the lower bracket on the left side of the front frame through a lower tow bar fixing seat. In an example, the upper end of the right lower tow bar is hinged to the right side of the tow bar connecting seat, and the lower end of the right lower tow bar is hinged to the lower bracket on the right side of the front frame through a lower tow bar fixing seat;

In some embodiments, the locking mechanism includes an unlocking pull ring, a push rod, a locking block, a reset spring, steel posts and pressing springs. The unlocking pull ring is mounted on the handle in a vertical moving mode, and the push rod, the locking block and the reset spring are all located in the upper tow bar. In addition, in an example, the upper end of the push rod is fixedly connected with the unlocking pull ring, and the lower end of the push rod is fixedly connected with the locking block; the upper end of the reset spring is connected with the locking block, and the lower end of the reset spring is connected with the upper portion of the tow bar limiting seat.

In some embodiments, the steel posts are transversely arranged on the left side and the right side. In addition, in an example, steel post mounting grooves are formed in the left side and the right side of the center opening of the tow bar connecting seat respectively and communicate with the center opening of the tow bar connecting seat. Further, the steel posts can are mounted in the steel post mounting grooves in a transversely telescopic mode through the pressing springs, and the ends, facing the upper tow bar, of the steel posts are semispherical parts and abut against the outer wall of the upper tow bar.

In some embodiments, locking openings are formed in the left side and the right side of the lower end of the upper tow bar respectively. Furthermore, clamping grooves can be formed in the left side and the right side of the locking block. In addition, in an example, the upper end of each clamping groove is an oblique surface, and the lower end of each clamping groove is deeper than the upper end of the clamping groove; the steel posts penetrate through the locking openings and stretch into the clamping grooves to lock the upper tow bar when completely stretching out of the upper tow bar. In some embodiments, under the dual effect of the reset spring and the push rod, the clamping grooves in the locking block make the locking openings in the upper tow bar within the groove width ranges of the lower ends of the clamping grooves all the time.

Furthermore, in an example, the front bottom beam and the rear bottom beam are each of a V shape, and turning seats are arranged at the rear end of the front bottom beam and the front end of the rear bottom beam respectively. In an example, the two turning seats are hinged through a hinge shaft, the front end of the front bottom beam is hinged to the lower brackets on the front frame, and the rear end of the rear bottom beam is hinged to the lower brackets on the rear frame.

The folding type collapsible wagon of the present disclosure mainly has the beneficial effects that through the design of the coplanar X-shaped cross tube assemblies, the structure is attractive, and the space utilization is high through the usage of the bearing hinged joints, the dual-cross assemblies also participate in force bearing, so that the bearing capacity is high, and all the components participate in force bearing.

BRIEF DESCRIPTION OF THE SEVERAL VIEWS OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE DISCLOSURE

The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

A further description of the present disclosure is given with the accompanying drawings.

Figure 1:
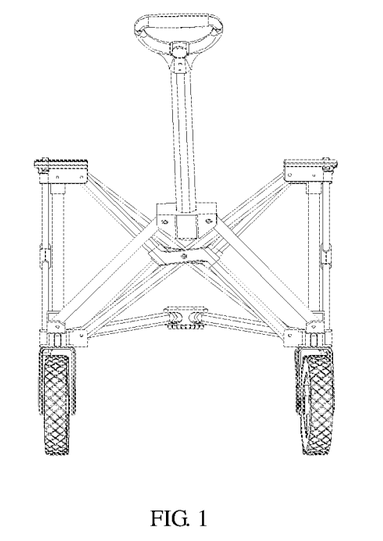
FIG. 1 is a front view of the present disclosure.
Figure 2:
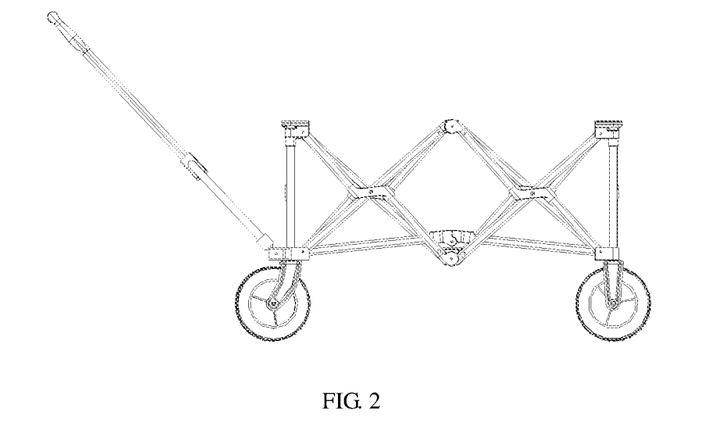
FIG. 2 is a left view of FIG. 1.
Figure 3:
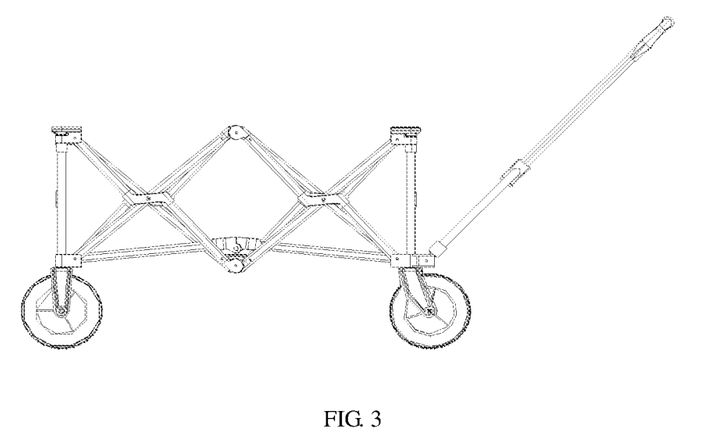
FIG. 3 is a right view of FIG. 1
Figure 4:
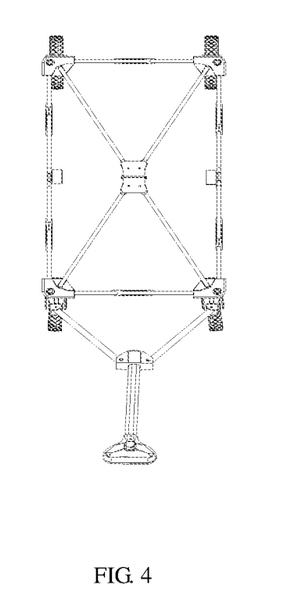
FIG. 4 is a top view of FIG. 1.
Figure 5:
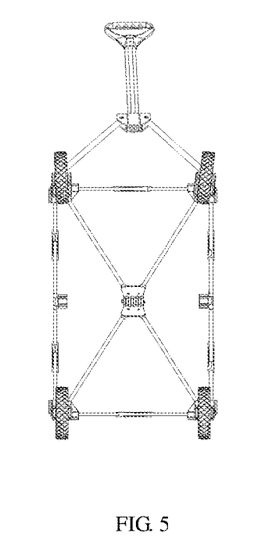
FIG. 5 is an upward view of FIG. 1.
Figure 6:
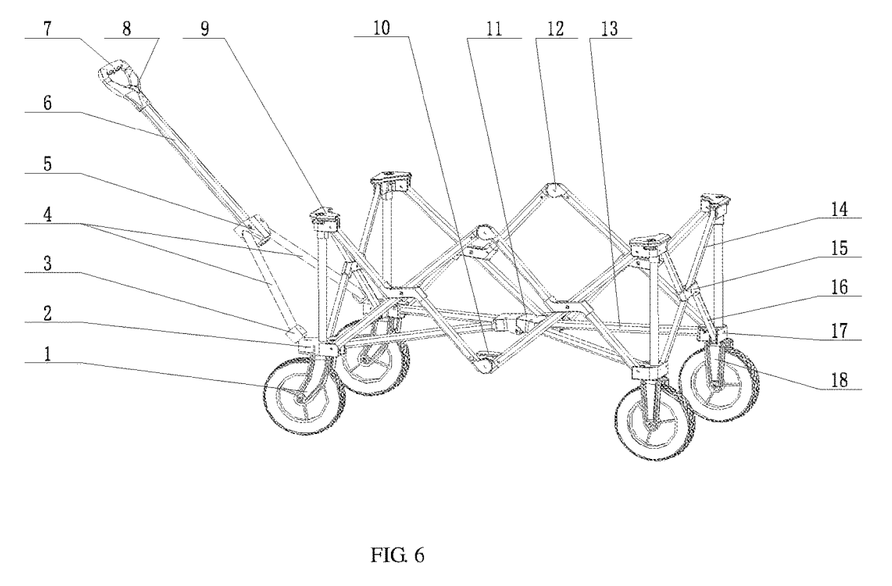
FIG. 6 is a schematic diagram of the present disclosure in the full-unfolded state.
Figure 7:
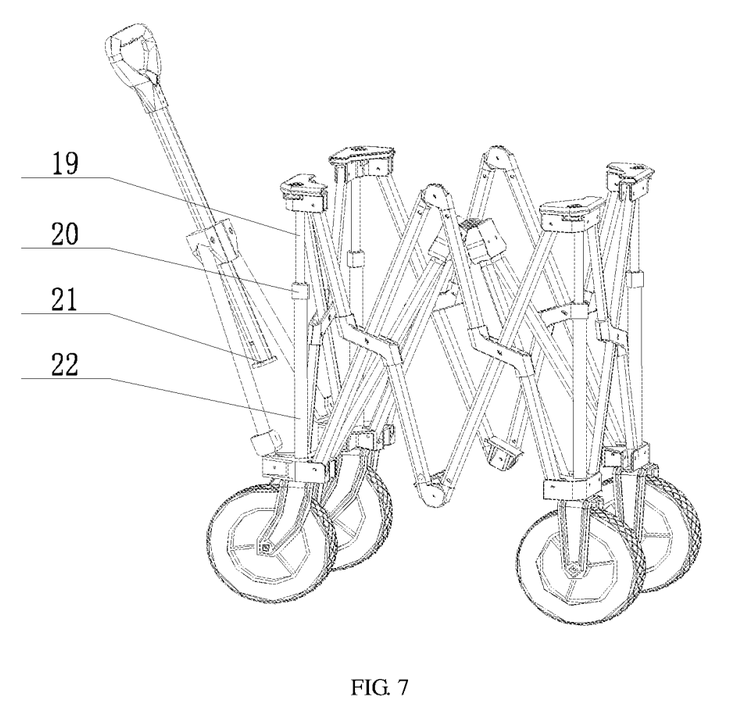
FIG. 7 is a schematic diagram of the present disclosure in the semi-unfolded state.
Figure 8:
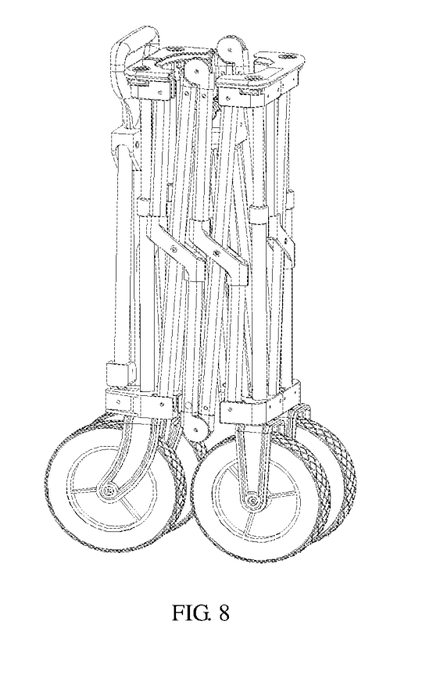
FIG. 8 is a schematic diagram of the present disclosure in a full-folded state.
Figure 9:
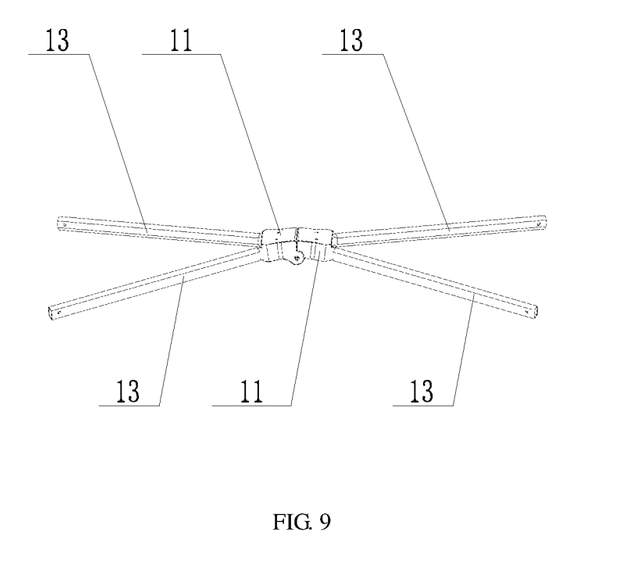
FIG. 9 is a structural schematic diagram of a bottom frame.
Figure 10:
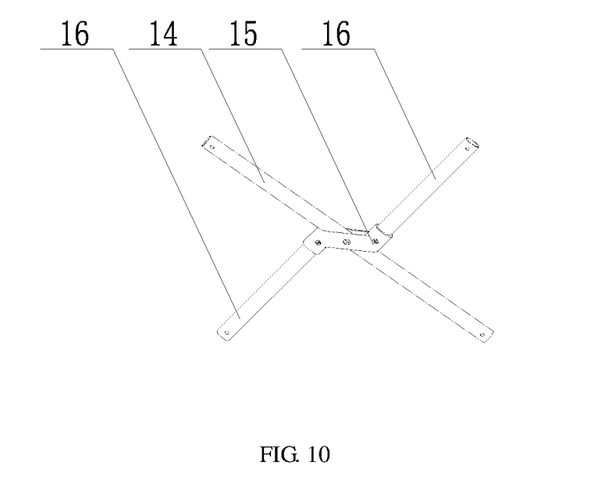
FIG. 10 is a structural schematic diagram of a single coplanar X-shaped cross tube assembly.
Figure 11:
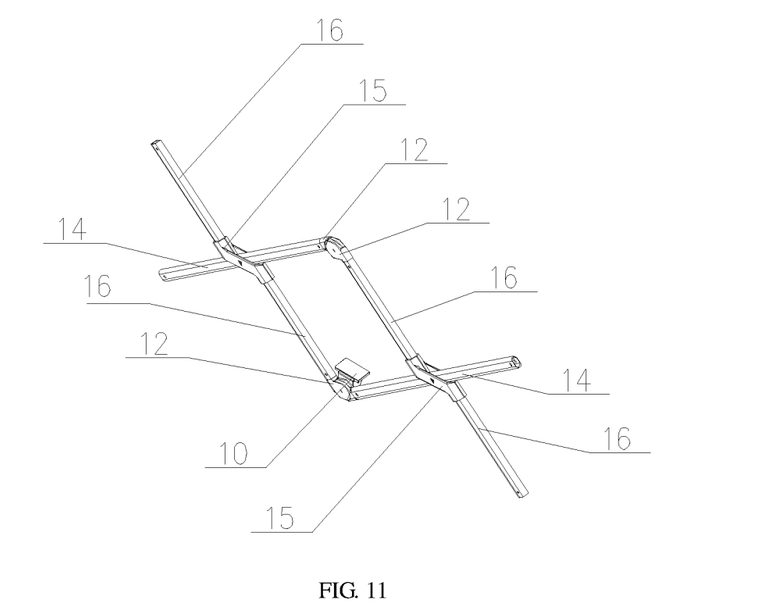
FIG. 11 is a structural schematic diagram of two coplanar X-shaped cross tube assemblies.
Figure 12:
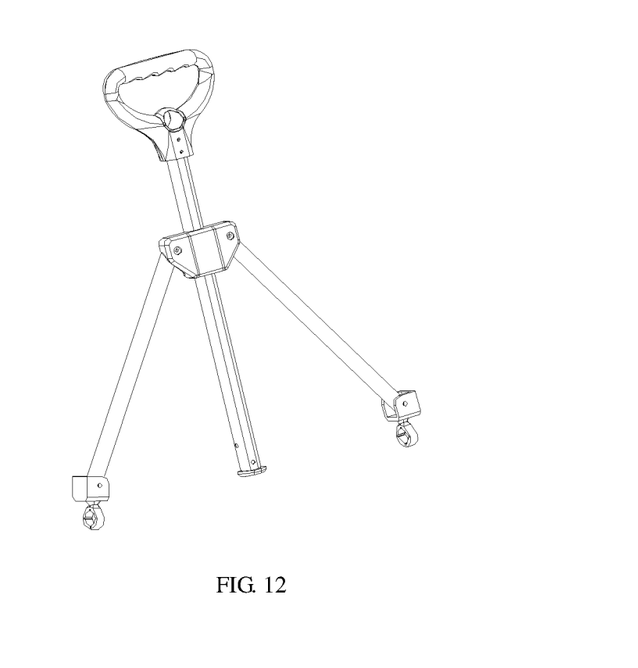
FIG. 12 is a structural schematic diagram of a tow bar assembly.
Figure 13:
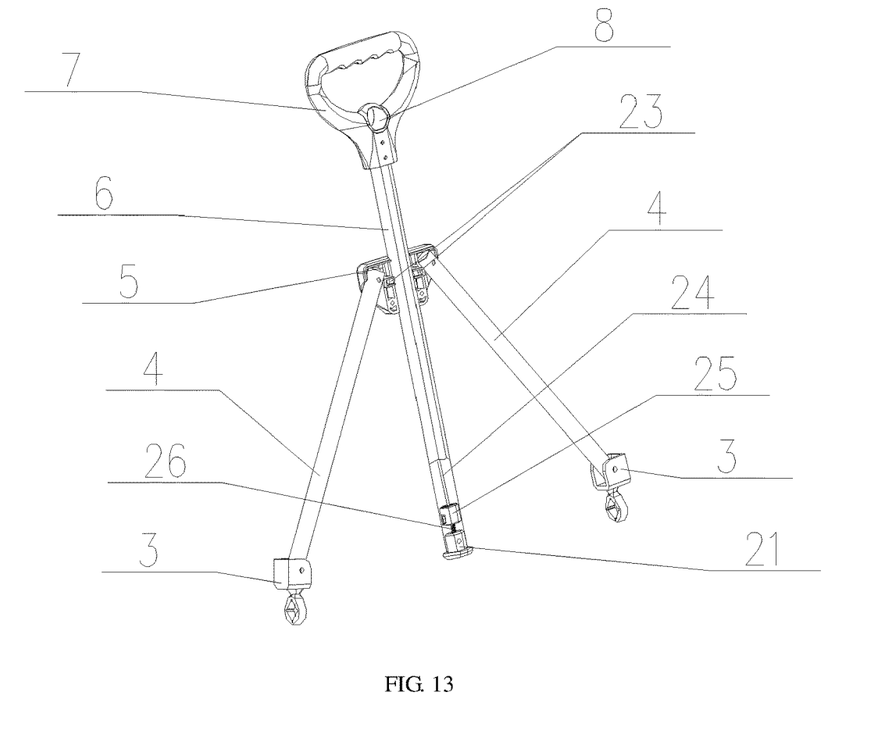
FIG. 13 is a part sectional view of the tow bar assembly.
Figure 14:
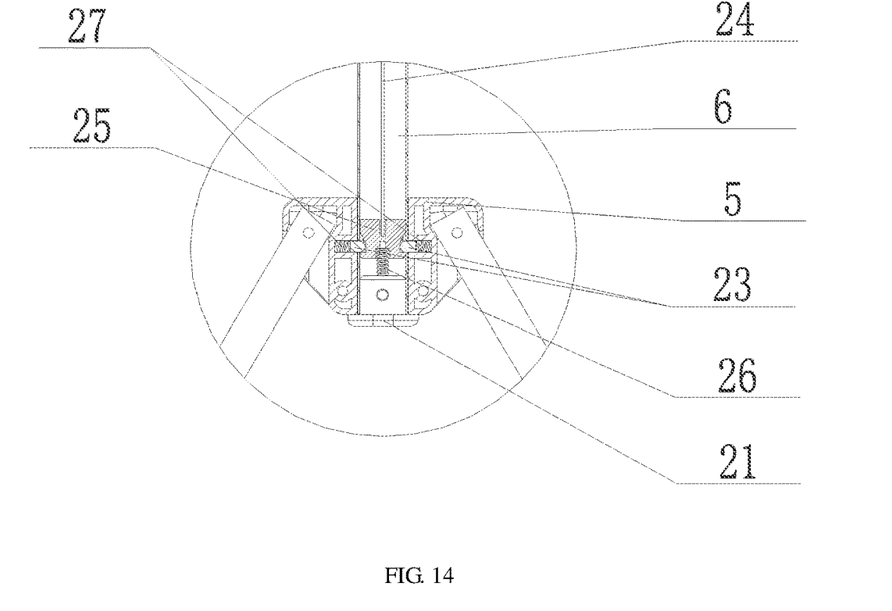
FIG. 14 is a part sectional view of the tow bar assembly in the locked state.
Figure 15:
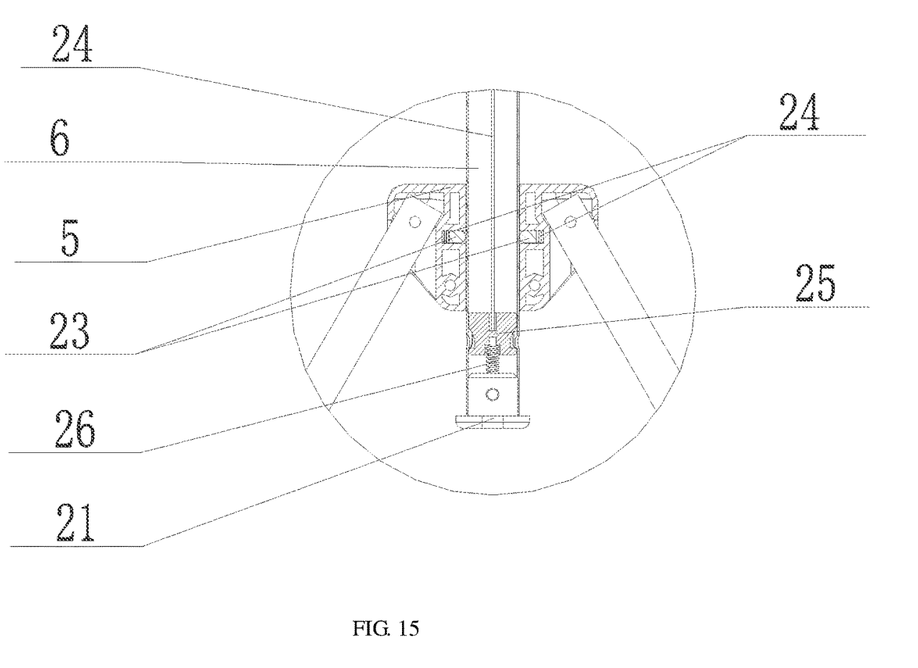
FIG. 15 is a part sectional view of the tow bar assembly in the unlocked state.

Please see FIGS. 1-15, a folding type collapsible wagon includes a frame assembly, a tow bar assembly and wheels. In an example, the tow bar assembly is arranged in front of the frame assembly, the wheels are arranged at the bottom of the frame assembly, and the frame assembly. In an example, the frame assembly includes a bottom frame, a front frame arranged in front of the bottom frame, a rear frame arranged behind the bottom frame, and collapsible side frames arranged on the left side and the right side of the bottom frame. Each side frame comprises coplanar X-shaped cross tube assemblies; each coplanar X-shaped cross tube assembly comprises a first oblique tube 14, two second oblique tubes 16 and a hollow seat.

In some embodiments, a strip opening is formed in the middle of the hollow seat in the front-back direction, tube connectors are oppositely arranged at the front end and the rear end of the hollow seat 15 in the vertical direction respectively. In an example, the first oblique tube 14 penetrates through the first strip opening and is hinged to the middle of the first strip opening at the center through a hinge shaft.

In an example, the two second oblique tubes 16 are mounted in the tube connectors at the front end and the rear end of the hollow seat 15 respectively. In an example, the two second oblique tubes are arranged in parallel and intersect with the first oblique tube in an X shape, and the first oblique tube 14, the two second oblique tubes 16 and the hollow seat 15 are all located on the same plane.

In some embodiments, the first oblique tube 14 is at least 50% greater in length than either of the two second oblique tubes 16. In an example, the first oblique tube 14 is greater than 2 times as great in length as either of the two second oblique tubes 16.

In some embodiments, the front ends and the rear ends of the side frames are hinged to the front frame and the rear frame through upper brackets 9 and lower brackets respectively. In an example, the bottom frame includes a front bottom beam and a rear bottom beam, the rear end of the front bottom beam and the front end of the rear bottom beam, for example, that can be turned by 90 degrees to be hinged together. Further, in an example, the front end of the front bottom beam is hinged to the lower brackets of the front frame, and the rear end of the rear bottom beam is hinged to the lower brackets of the rear frame.

In some embodiments, the front frame includes a coplanar X-shaped cross tube assembly, inner guide tubes 19 and outer guide tubes 22. In an example, the inner guide tubes 19 and the outer guide tubes 22 are all arranged vertically, the upper ends of the inner guide tubes 19 are connected with the upper brackets, the lower ends of the inner guide tubes 19 are mounted in the outer guide tubes 22 in a vertically telescopic mode, and the lower ends of the outer guide tubes 22 are connected with the lower brackets. In some embodiments, the structure of the rear frame is the same as the structure of the front frame.

Furthermore, in some embodiments, each side frame includes two coplanar X-shaped cross tube assemblies arranged side by side. In an example, the two coplanar X-shaped cross tube assemblies are the front coplanar X-shaped cross tube assembly and the rear coplanar X-shaped cross tube assembly respectively. In an example, the front end of the first oblique tube of the front coplanar X-shaped cross tube assembly of the side frame on the left side of the bottom frame is hinged to the lower bracket on the left side of the front frame, and the rear end of the first oblique tube of the front coplanar X-shaped cross tube assembly of the side frame on the left side of the bottom frame is hinged to the front end of the front second oblique tube of the rear coplanar X-shaped cross tube assembly on the same side through a hinged joint 12.

In some embodiments, the front end of the front second oblique tube of the front coplanar X-shaped cross tube assembly of the side frame on the left side of the bottom frame is hinged to the upper bracket on the left side of the front frame, and the rear end of the rear second oblique tube of the front coplanar X-shaped cross tube assembly of the side frame on the left side of the bottom frame is hinged to the front end of the first oblique tube of the rear coplanar X-shaped cross tube assembly on the same side through a bearing hinged joint 10.

In some embodiments, the rear end of the first oblique tube of the rear coplanar X-shaped cross tube assembly of the side frame on the left side of the bottom frame is hinged to the upper bracket on the rear frame, and the rear end of the rear second oblique tube of the rear coplanar X-shaped cross tube assembly of the side frame on the left side of the bottom frame is hinged to the lower bracket on the left side of the rear frame.

In some embodiments, the front end of the first oblique tube of the front coplanar X-shaped cross tube assembly of the side frame on the right side of the bottom frame is hinged to the upper bracket on the right side of the front frame, and the rear end of the first oblique tube of the front coplanar X-shaped cross tube assembly of the side frame on the right side of the bottom frame is hinged to the front end of the front second oblique tube of the rear coplanar X-shaped cross tube assembly on the same side through a bearing hinged joint 10.

In some embodiments, the front end of the front second oblique tube of the front coplanar X-shaped cross tube assembly of the side frame on the right side of the bottom frame is hinged to the lower bracket on the right side of the front frame, and the rear end of the rear oblique second tube of the front coplanar X-shaped cross tube assembly of the side frame on the right side of the bottom frame is hinged to the front end of the first oblique tube of the rear coplanar X-shaped cross tube assembly on the same side through a hinged joint 12.

In some embodiments, the rear end of the first oblique tube of the rear coplanar X-shaped cross tube assembly of the side frame on the right side of the bottom frame is hinged to the lower bracket on the right side of the rear frame, and the rear end of the rear second oblique tube of the rear coplanar X-shaped cross tube assembly of the side frame on the right side of the bottom frame is hinged to the upper bracket of the rear frame.

In some embodiments, the left end of the first oblique tube of the coplanar X-shaped cross tube assembly of the front frame is hinged to the upper bracket on the left side of the front frame, the right end of the first oblique tube of the coplanar X-shaped cross tube assembly of the front frame is hinged to the lower bracket on the right side of the front frame, the left end of the left second oblique tube of the coplanar X-shaped cross tube assembly of the front frame is hinged to the lower bracket on the left side of the front frame, and the right end of the right second oblique tube of the coplanar X-shaped cross tube assembly of the front frame is hinged to the upper bracket on the right side of the front frame.

In some embodiments, the left end of the first oblique tube of the coplanar X-shaped cross tube assembly of the rear frame is hinged to the lower bracket on the left side of the rear frame, the right end of the first oblique tube of the coplanar X-shaped cross tube assembly of the rear frame is hinged to the upper bracket on the right side of the rear frame, the left end of the left second oblique tube of the coplanar X-shaped cross tube assembly of the rear frame is hinged to the upper bracket on the left side of the rear frame, and the right end of the right second oblique tube of the coplanar X-shaped cross tube assembly of the rear frame is hinged to the lower bracket on the right side of the rear frame.

Furthermore, in some embodiments, the tow bar assembly includes a handle 7, an upper tow bar 6, a tow bar connecting seat 5, a tow bar limiting seat 21 used for preventing the upper tow bar from being pulled out, two lower tow bars 4 and a locking mechanism. In an example, the upper end of the upper tow bar 6 is fixedly connected with the handle 7, the tow bar limiting seat is in a T shape, the lower portion of the tow bar limiting seat 21 is fixed to the bottom of the lower end of the upper tow bar 6, the maximum outer diameter of the tow bar limiting seat 21 is greater than the outer diameter of the upper tow bar, and the upper portion of the tow bar limiting seat 21 stretches into the upper tow bar 6 from bottom to top.

In addition, in some embodiments, the two lower tow bars 4 are the left lower tow bar and the right lower tow bar respectively. In addition, the tow bar connecting seat 5 is provided with a center opening in the axial direction, and arranged outside the upper tow bar 6 in a sleeving mode and located above the tow bar limiting seat 21. In an example, the upper end of the left lower tow bar is hinged to the left side of the tow bar connecting seat 5, the lower end of the left lower tow bar is hinged to the lower bracket on the left side of the front frame through a lower tow bar fixing seat 3, the upper end of the right lower tow bar is hinged to the right side of the tow bar connecting seat 5, and the lower end of the right lower tow bar is hinged to the lower bracket on the right side of the front frame through a lower tow bar fixing seat 3.

Furthermore, in some embodiments, the locking mechanism includes an unlocking pull ring 8, a push rod 24, a locking block 25, a reset spring 26, steel posts 23 and pressing springs 27, wherein the unlocking pull ring 8 is mounted on the handle 7 in a vertical moving mode, and the push rod 24.

In an example, the locking block 25 and the reset spring 26 are all located in the upper tow bar. In an example, the upper end of the push rod 24 is fixedly connected with the unlocking pull ring 8, and the lower end of the push rod 24 is fixedly connected with the locking block 25, the upper end of the reset spring 26 is connected with the locking block 25, and the lower end of the reset spring 26 is connected with the upper portion of the tow bar limiting seat 21.

In some embodiments, the steel posts 23 are transversely arranged on the left side and the right side, steel post mounting grooves are formed in the left side and the right side of the center opening of the tow bar connecting seat 5 respectively and communicate with the center opening of the tow bar connecting seat 5. For example, the steel posts 23 are mounted in the steel post mounting grooves in a transversely telescopic mode through the pressing springs 27, and the ends, facing the upper tow bar 6, of the steel posts 23 are semispherical parts and abut against the outer wall of the upper tow bar 6.

In some embodiments, locking openings are formed in the left side and the right side of the lower end of the upper tow bar 6 respectively, clamping grooves are formed in the left side and the right side of the locking block 25, the upper end of each clamping groove is an oblique surface, and the lower end of each clamping groove is deeper than the upper end of the clamping groove; the steel posts 23 penetrate through the locking openings and stretch into the clamping grooves to lock the upper tow bar 6 when completely stretching out of the upper tow bar.

Under the dual effect of the reset spring 26 and the push rod, the clamping grooves in the locking block 25 make the locking openings in the upper tow bar 6 within the groove width ranges of the lower ends of the clamping grooves all the time.

Furthermore, in some embodiments, the front bottom beam and the rear bottom beam are each of a V shape, turning seats 11 are arranged at the rear end of the front bottom beam and the front end of the rear bottom beam respectively. In an example, the two turning seats are hinged through a hinge shaft. In an example, the front end of the front bottom beam is hinged to the lower brackets on the front frame, and the rear end of the rear bottom beam is hinged to the lower brackets on the rear frame.

In some embodiments, the lower brackets include the front lower brackets 2 and the rear lower brackets 17. In an example, the front frame and the rear frame are each composed of a single coplanar X-shaped cross tube assembly. Specifically, after the second oblique tubes 16 inserted into the two ends of the hollow seat 15 are integrally riveted, the middle of the first oblique tube 14 penetrating into the strip opening is integrally riveted to the center of the hollow seat 15 so that the first oblique tube 14 can rotate around the axis of a rivet. Furthermore, the first oblique tube 14 is located in the strip opening of the hollow seat 15 in an abutting mode when rotating by 90 degrees. In addition, the whole X-shaped cross tube assembly is located on the same plane both in the folded state and the unfolded state.

In some embodiments, each side frame is composed of two coplanar X-shaped cross tube assemblies. In an example, two face-to-face hinged joints 12 are fixed to the upper portions of the two coplanar X-shaped cross tube assemblies respectively and connected through a rivet so that the coplanar X-shaped cross tube assemblies can rotate.

In some embodiments, the ends of the second oblique tubes 16 are connected with the hinged joints 12, the ends of the first oblique tubes 14 are connected with the bearing hinged joints 10, and the second oblique tubes 16 and the first oblique tubes 14 are also connected through rivets so that the second oblique tubes 16 and the first oblique tubes 14 can rotate.

As such, when the wagon is unfolded, the first oblique tubes 14 and the second oblique tubes 16 have the maximum size when rotating by 90 degrees, and all the parts are located on the same plane.

When the wagon is folded, the first oblique tubes 14 and the second oblique tubes 16 are folded in placed when in parallel, and all the parts are located on the same plane. The bottom frame is formed by combining a V-shaped component formed by riveting a turning seat 11 and two bottom cross beams 13 with another identical V-shaped component in a screwed mode. The other ends of the four bottom cross beams 13 are connected with the two front lower brackets 2 and the two rear lower brackets 17 respectively.

When the wagon is folded, the turning seats 11 are pulled upwards, so that the four bottom cross beams 13 drive the front lower brackets 2 and the rear lower brackets 17 to draw close to the center to be folded.

When the wagon is unfolded, the turning seats 11 are pressed downwards, so that the four bottom cross beams 13 push the front lower brackets 2 and the rear lower brackets 17 to stretch outwards.

In accordance to the tow bar assembly, the handle 7 is fixed to the upper tow bar 6, and the unlocking pull ring 8 is inlaid in the handle 7 of the wagon, can move up and down and is used for allowing the upper tow bar 6 to be pulled upwards and pressed downwards in the center opening of the tow bar connecting seat 5 or preventing the upper tow bar 6 from being pulled upwards and pressed downwards in the center opening of the tow bar connecting seat 5. In addition, the lower tow bars 4 riveted to the two sides of the tow bar connecting seat 5 are connected with the front lower brackets 2 through the lower tow bar fixing seats 3 connected to the lower tow bar 4.

When the wagon is folded, the lower tow bars 4 are folded along with the front lower brackets 2, then the unlocking pull ring 8 is pressed downwards so that the push rod 24 below the unlocking pull ring 8 can push the locking block 25 to move downwards. In an example, the steel posts 23 in the clamping grooves of the clamping block 25 are made to stretch upwards along with the oblique surfaces until penetrating out of the locking openings of the upper tow bar 6, the locking state is relieved accordingly, then the handle 7 is pressed downwards to slide to the tow bar connecting seat 5, and thus the folding size is reduced.

When the wagon is unfolded, the lower tow bars 4 stretch outwards along with the front lower brackets 2 to the maximum extent. Following, the handle 7 is pulled upwards when the lower tow bars 4 stretch outwards to the maximum extent. As such, the two steel posts 23 located in the center opening of the tow bar connecting seat 5 and pressed on the outer wall of the upper tow bar 6 are made to fall into the locking openings in the upper tow bar 6. In addition, the clamping grooves of the locking block 25 under the effect of the pressing springs 27, and thus a locking effect is achieved.

Each rear wheel carrier 18 is composed of one wheel and a straight iron carrier, fixed to the lower portion of one rear lower bracket 17 and used for supporting.

Each front wheel carrier 1 is composed of one wheel and a bent iron carrier, fixed to the lower portion of one front lower bracket 2 and used for supporting and steering.

In yet another aspect of the present disclosure, according to the working process of the folding type collapsible wagon of the present disclosure. In one embodiment, the folding type collapsible wagon includes the two coplanar X-shaped cross tube assemblies on each of the two sides, the front single coplanar X-shaped cross tube assembly, the rear single coplanar X-shaped cross tube assembly, two V-shaped turning assemblies at the bottom, the tow bar assembly of the wagon, the front rolling wheel carriers and the rear rolling wheel carriers.

In some embodiments, the upper portions of the two coplanar X-shaped cross tube assemblies on the two sides are connected with the upper brackets 9, and the lower portions of the two coplanar X-shaped cross tube assemblies on the two sides are connected with the front lower brackets 2 and the rear lower brackets 17 respectively.

In some embodiments, the upper portions of the front single coplanar X-shaped cross tube assembly and the rear single coplanar X-shaped cross tube assembly are connected with the upper brackets 9, and the lower portions of the front single coplanar X-shaped cross tube assembly and the rear single coplanar X-shaped cross tube assembly are connected with the front lower brackets 2 or the rear lower brackets 17.

In some embodiments, the two V-shaped turning assemblies at the bottom are connected to the two front lower brackets 2 and the two rear lower brackets 17 in a riveted mode, the front wheel carriers 1 are fixed to the lower portions of the front lower brackets 2, and the rear wheel carriers 18 are fixed to the lower portions of the rear lower brackets 17. In an example, the tow bar assembly is fixed to the front ends of the front lower brackets.

When the wagon is folded, the turning seats 11 are pulled upwards, so that the four bottom cross beams 13 drive the front lower brackets 2 and the rear lower brackets 17 are draw close to the center to be folded. Additionally, the front lower brackets 2 and the rear lower brackets 17 drive the front wheel carriers on the front lower brackets 2, the rear wheel carriers on the rear lower brackets 17, the two coplanar X-shaped cross tube assemblies on each of the two sides, the front and rear coplanar X-shaped cross tube assemblies, the lower tow bars 4, the outer guide tubes 22, the inner guide tubes 19 and the upper brackets 9 are drawn close to the center at the same time.

At the moment, the two coplanar X-shaped cross tube assemblies on each of the two sides, the front single coplanar X-shaped cross tube assembly and the rear single coplanar X-shaped cross tube assembly are folded synchronously, the distances between the front and rear lower brackets and the upper brackets 9 are increased. Thus, the inner guide tubes 19 arranged in the outer guide tubes 22 in a sleeved mode are pulled out accordingly, and thus the frame is kept upright and prevented from distorting.

Meanwhile, when the unlocking pull ring 8 is pressed downwards, the tow bar connecting seat 5 and the upper tow bar 6 are unlocked, the handle 7 slides downwards to the tow bar connecting seat 5, and thus the folding size is reduced.

On the other hand, when the wagon is unfolded, the turning seats 11 are pressed downwards, so that the four bottom cross beams 13 push the front lower brackets 2 and the rear lower brackets 17 to stretch outwards, and all components connected with the front lower brackets 2 and the rear lower brackets 17 are driven to stretch accordingly.

In some embodiments, the first oblique tubes 14 and the second oblique tubes 16 in the two coplanar X-shaped cross tube assemblies on each of the two sides. In one example, the front single coplanar X-shaped cross tube assembly and the rear single coplanar X-shaped cross tube assembly abut against one another completely when rotating by 90 degrees. In an example, the two turning seats 11 abut against each other at the same time, and thus the folding type collapsible wagon is unfolded to the maximum extent.

When the two V-shaped turning assemblies at the bottom are stressed, the two turning seats 11 abutting against each other are parallel to the upper planes of the bearing hinged joints 10 after eliminating gaps between all openings in the falling process, and thus the two coplanar X-shaped cross tube assemblies on each of the two sides can share part of the weight. At the moment, the inner guide tubes 19 are pressed into the outer guide tubes 22 by the upper brackets 9 and pressed onto tube sleeves 20, and thus the outer guide tubes 22 can also share part of the weight.

When the wagon is pulled, the handle 7 is pulled upwards, the upper tow bar 6, the tow bar limiting seat 21 in the upper tow bar 6, the reset spring 26, the locking block 25 and the push rod 24 are driven to rise together until the steel posts 23 which are located in the tow bar connecting seat 5 and slide on the outer wall of the upper tow bar 6 fall into the locking openings in the bottom the upper tow bar 6. As such, locking and fixing functions are achieved.

Upon reading this specification, it should be appreciated that, under appropriate circumstances, considering such issues as user requirements or wishes, design considerations, marketing preferences, cost(s), structural requirement(s), available materials, technological advances, etc., other methods of use arrangements such as, for example, orders within above-mentioned list that are different, eliminated and/or additional steps, including or eliminating, for example, procedure, process, and/or maintenance step(s), etc., may be sufficient.

It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context.

In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, and as described herein are expressly contemplated as being equivalent within the scope of the claims and understood by those knowledgeable in the art. Therefore, obvious substitutions now or later known to one with ordinary skill in the art are defined to be within the scope of the defined elements and the reading of the specification as described herein.

The claims are thus to be understood to include what is specifically illustrated and described above, what is conceptually equivalent, what can be obviously substituted and also what essentially incorporates the essential idea of the embodiment. In addition, where the specification and claims refer to at least one of something selected from the group consisting of A, B, C . . . and N, the text should be interpreted as requiring only one element from the group, not A plus N, or B plus N, etc

What is claimed is:

1. A folding type collapsible wagon, comprising:
a frame assembly;
a tow bar assembly and wheels, the tow bar assembly is arranged in front of the frame assembly, and the wheels are arranged at the bottom of the frame assembly; and
tube connectors;
wherein the frame assembly comprises a bottom frame, a front frame arranged in front of the bottom frame, a rear frame arranged behind the bottom frame, and collapsible side frames arranged on the left side and the right side of the bottom frame;
wherein the front frame comprises a coplanar X-shaped cross tube assembly, inner guide tubes and outer guide tubes, the inner guide tubes and the outer guide tubes are all arranged vertically;
wherein each side frame comprises the coplanar X-shaped cross tube assemblies;
wherein each coplanar X-shaped cross tube assembly comprises a first oblique tube, two second oblique tubes and a hollow seat;
wherein the tube connectors are oppositely arranged at the front end and the rear end of the hollow seat in the vertical direction respectively, and
wherein the two second oblique tubes are mounted in the tube connectors at the front end and the rear end of the hollow seat respectively, and the two second oblique tubes are arranged in parallel and intersect with the first oblique tube in an X shape, and the first oblique tube, the two second oblique tubes and the hollow seat are all located on the same plane.

2. The folding type collapsible wagon of claim 1,
wherein a strip opening is formed in the middle of the hollow seat in the front-back direction and the first oblique tube penetrates through the strip opening of the hollow seat and is hinged about the strip opening through a hinge shaft; and
wherein the first oblique tube is at least 50% greater in length than either of the two second oblique tubes.

3. The folding type collapsible wagon of claim 1,
wherein the front ends and the rear ends of the side frames are hinged to the front frame and the rear frame through upper brackets and lower brackets respectively; and
wherein the bottom frame comprises a front bottom beam and a rear bottom beam, the rear end of the front bottom beam and the front end of the rear bottom beam can be turned by 90 degrees to be hinged together, the front end of the front bottom beam is hinged to the lower brackets of the front frame, and the rear end of the rear bottom beam is hinged to the lower brackets of the rear frame.

4. The folding type collapsible wagon of claim 1,
wherein the upper ends of the inner guide tubes are connected with the upper brackets, the lower ends of the inner guide tubes are mounted in the outer guide tubes in a vertically telescopic mode, and the lower ends of the outer guide tubes are connected with the lower brackets; the structure of the rear frame is the same as the structure of the front frame.

5. The folding type collapsible wagon of claim 1,
wherein each side frame comprises two coplanar X-shaped cross tube assemblies arranged side by side; wherein the two coplanar X-shaped cross tube assemblies are the front coplanar X-shaped cross tube assembly and the rear coplanar X-shaped cross tube assembly respectively; and
wherein the front end of the first oblique tube of the front coplanar X-shaped cross tube assembly of the side frame on the left side of the bottom frame is hinged to the lower bracket on the left side of the front frame.

6. The folding type collapsible wagon of claim 1,
wherein the rear end of the first oblique tube of the front coplanar X-shaped cross tube assembly of the side frame on the left side of the bottom frame is hinged to the front end of the front second oblique tube of the rear coplanar X-shaped cross tube assembly on the same side through a hinged joint.

7. The folding type collapsible wagon of claim 1,
wherein the front end of the front second oblique tube of the front coplanar X-shaped cross tube assembly of the side frame on the left side of the bottom frame is hinged to the upper bracket on the left side of the front frame, and the rear end of the rear second oblique tube of the front coplanar X-shaped cross tube assembly of the side frame on the left side of the bottom frame is hinged to the front end of the first oblique tube of the rear coplanar X-shaped cross tube assembly on the same side through a bearing hinged joint.

8. The folding type collapsible wagon of claim 7,
wherein the rear end of the first oblique tube of the rear coplanar X-shaped cross tube assembly of the side frame on the left side of the bottom frame is hinged to the upper bracket on the rear frame, and the rear end of the rear second oblique tube of the rear X-shaped cross tube assembly of the side frame on the left side of the bottom frame is hinged to the lower bracket on the left side of the rear frame; and
wherein the front end of the first oblique tube of the front coplanar X-shaped cross tube assembly of the side frame on the right side of the bottom frame is hinged to the upper bracket on the right side of the front frame, the rear end of the first oblique tube of the front coplanar X-shaped cross tube assembly of the side frame on the right side of the bottom frame is hinged to the front end of the front second oblique tube of the rear coplanar X-shaped cross tube assembly on the same side through a bearing hinged joint.

9. The folding type collapsible wagon of claim 8,
wherein the front end of the front second oblique tube of the front coplanar X-shaped cross tube assembly of the side frame on the right side of the bottom frame is hinged to the lower bracket on the right side of the front frame, and the rear end of the rear oblique second tube of the front coplanar X-shaped cross tube assembly of the side frame on the right side of the bottom frame is hinged to the front end of the first oblique tube of the rear coplanar X-shaped cross tube assembly on the same side through a hinged joint; and
wherein the rear end of the first oblique tube of the rear coplanar X-shaped cross tube assembly of the side frame on the right side of the bottom frame is hinged to the lower bracket on the right side of the rear frame, and the rear end of the rear second oblique tube of the rear coplanar X-shaped cross tube assembly of the side frame on the right side of the bottom frame is hinged to the upper bracket of the rear frame.

10. The folding type collapsible wagon of claim 9, wherein the left end of the first oblique tube of the coplanar X-shaped cross tube assembly of the front frame is hinged to the upper bracket on the left side of the front frame, the right end of the first oblique tube of the coplanar X-shaped cross tube assembly of the front frame is hinged to the lower bracket on the right side of the front frame, the left end of the left second oblique tube of the coplanar X-shaped cross tube assembly of the front frame is hinged to the lower bracket on the left side of the front frame, and wherein the right end of the right second oblique tube of the coplanar X-shaped cross tube assembly of the front frame is hinged to the upper bracket on the right side of the front frame.

11. The folding type collapsible wagon of claim 10, wherein the left end of the first oblique tube of the coplanar X-shaped cross tube assembly of the rear frame is hinged to the lower bracket on the left side of the rear frame, the right end of the first oblique tube of the coplanar X-shaped cross tube assembly of the rear frame is hinged to the upper bracket on the right side of the rear frame; and wherein the left end of the left second oblique tube of the coplanar X-shaped cross tube assembly of the rear frame is hinged to the upper bracket on the left side of the rear frame, and the right end of the right second oblique tube of the coplanar X-shaped cross tube assembly of the rear frame is hinged to the lower bracket on the right side of the rear frame.

12. The folding type collapsible wagon of claim 1, wherein the tow bar assembly comprises a handle, an upper tow bar, a tow bar connecting seat, a tow bar limiting seat used for preventing the upper tow bar from being pulled out, two lower tow bars and a locking mechanism.

13. The folding type collapsible wagon of claim 12, wherein the upper end of the upper tow bar is fixedly connected with the handle, the tow bar limiting seat is in a T shape, the lower portion of the tow bar limiting seat is fixed to the bottom of the lower end of the upper tow bar, the maximum outer diameter of the tow bar limiting seat is greater than the outer diameter of the upper tow bar, and the upper portion of the tow bar limiting seat stretches into the upper tow bar from bottom to top; and wherein the two lower tow bars are the left lower tow bar and the right lower tow bar respectively.

14. The folding type collapsible wagon of claim 1, wherein the tow bar connecting seat is provided with a center opening in the axial direction, arranged outside the upper tow bar in a sleeving mode and located above the tow bar limiting seat, the upper end of the left lower tow bar is hinged to the left side of the tow bar connecting seat, the lower end of the left lower tow bar is hinged to the lower bracket on the left side of the front frame through a lower tow bar fixing seat, the upper end of the right lower tow bar is hinged to the right side of the tow bar connecting seat, and the lower end of the right lower tow bar is hinged to the lower bracket on the right side of the front frame through a lower tow bar fixing seat.

15. The folding type collapsible wagon of claim 1, wherein the locking mechanism comprises an unlocking pull ring, a push rod, a locking block, a reset spring, steel posts and pressing springs.

16. The folding type collapsible wagon of claim 15, wherein the unlocking pull ring is mounted on the handle in a vertical moving mode, and the push rod, the locking block and the reset spring are all located in the upper tow bar;

wherein the upper end of the push rod is fixedly connected with the unlocking pull ring, and the lower end of the push rod is fixedly connected with the locking block; and wherein the upper end of the reset spring is connected with the locking block, and the lower end of the reset spring is connected with the upper portion of the tow bar limiting seat.

17. The folding type collapsible wagon of claim 15, wherein locking openings are formed in the left side and the right side of the lower end of the upper tow bar respectively, clamping grooves are formed in the left side and the right side of the locking block; and wherein the upper end of each clamping groove is an oblique surface, and the lower end of each clamping groove is deeper than the upper end of the clamping groove.

18. The folding type collapsible wagon of claim 1, wherein the steel posts are transversely arranged on the left side and the right side, steel post mounting grooves are formed in the left side and the right side of the center opening of the tow bar connecting seat respectively and communicate with the center opening of the tow bar connecting seat, and wherein the steel posts are mounted in the steel post mounting grooves in a transversely telescopic mode through the pressing springs, and the ends, facing the upper tow bar, of the steel posts are semispherical parts and abut against the outer wall of the upper tow bar.

19. The folding type collapsible wagon of claim 18, wherein the steel posts penetrate through the locking openings and stretch into the clamping grooves to lock the upper tow bar when completely stretching out of the upper tow bar; under the dual effect of the reset spring and the push rod, the clamping grooves in the locking block make the locking openings in the upper tow bar within the groove width ranges of the lower ends of the clamping grooves all the time.

20. The folding type collapsible wagon of claim 1, wherein the front bottom beam and the rear bottom beam are each of a V shape;

wherein turning seats are arranged at the rear end of the front bottom beam and the front end of the rear bottom beam respectively;

wherein the two turning seats are hinged through a hinge shaft; the front end of the front bottom beam is hinged to the lower brackets on the front frame, and wherein the rear end of the rear bottom beam is hinged to the lower brackets on the rear frame.

* * * * *